(12) United States Patent
Miller et al.

(10) Patent No.: US 8,707,620 B2
(45) Date of Patent: Apr. 29, 2014

(54) SEEDLING TRAY

(75) Inventors: Daniel R. Miller, Cincinnati, OH (US); Jose Alessio Panosso, Sao Paulo (BR)

(73) Assignee: Buckhorn, Inc., Milford, OH (US)

( * ) Notice: Subject to any disclaimer, the term of this patent is extended or adjusted under 35 U.S.C. 154(b) by 119 days.

(21) Appl. No.: 13/344,948

(22) Filed: Jan. 6, 2012

(65) Prior Publication Data

US 2013/0174481 A1    Jul. 11, 2013

(51) Int. Cl.
 *A01G 9/10* (2006.01)
(52) U.S. Cl.
 USPC .................................. 47/87; 47/66.5
(58) Field of Classification Search
 USPC ............... 47/66.5, 66.6, 73, 77, 85–87, 901; D11/143, 155, 156, 164; 206/423, 558, 206/562, 563
 See application file for complete search history.

(56) References Cited

U.S. PATENT DOCUMENTS

| | | | |
|---|---|---|---|
| 3,667,159 A | 6/1972 | Todd | |
| 4,037,360 A | 7/1977 | Farnsworth | |
| 4,058,931 A | 11/1977 | Vestergaard | |
| 4,495,725 A * | 1/1985 | Talbott | 47/85 |
| D277,467 S * | 2/1985 | Turunen | D11/155 |
| D284,953 S | 8/1986 | Kaneko | |
| 4,769,946 A | 9/1988 | De Groot et al. | |
| D540,711 S | 4/2007 | Howard et al. | |
| 7,448,163 B2 | 11/2008 | Beeman et al. | |
| 2008/0120903 A1 * | 5/2008 | Fair et al. | 47/65.7 |
| 2008/0250711 A1 * | 10/2008 | Everhardus Lucas Langezaal et al. | 47/77 |

FOREIGN PATENT DOCUMENTS

| | | | | |
|---|---|---|---|---|
| TW | 359197 U | 6/2009 | | |
| WO | WO 2005094558 A1 * | 10/2005 | | A01G 9/10 |
| WO | WO 2005094559 A1 * | 10/2005 | | A01G 9/10 |
| WO | WO 2005094560 A1 * | 10/2005 | | A01G 9/10 |

OTHER PUBLICATIONS http://www.youtube.com/watch?v=4sVZgZnd67g,10Buck2ideas How to seed a Hydroponic Floating Tray, uploaded Jan. 19, 2011, 4 pp.

* cited by examiner

*Primary Examiner* — David Parsley
*Assistant Examiner* — Danielle Clerkley
(74) *Attorney, Agent, or Firm* — Mattingly & Malur, PC

(57) ABSTRACT

A seedling tray includes a top body member constructed of a rigid solid plastic material having a plurality of planting cells formed in an upper surface with each of the cells converging downwardly and inwardly to define an opening at the bottom thereof. A plurality of air chambers are formed between adjacent ones of the cells which are closed at the bottom by a bottom plate member constructed of a rigid plastic material which is fixedly attached to the body member and which has openings therein corresponding in number and alignment with the openings of the bottoms of the cells which are sealingly engaged with the openings in the bottom plate member.

4 Claims, 8 Drawing Sheets

SEEDLING TRAY

BACKGROUND OF THE INVENTION

1. Field of the Invention

The present invention relates to an improved seedling tray and more particularly to a multi-cell floating seedling tray for hydroponically growing plants.

2. Description of the Related Art

Many farming operation for crops such as tobacco and vegetables require the necessity for transplanting seedlings each year. The seedlings are normally started from seeds in a controlled environment such as a hot house and upon reaching a desired size, the seedlings are transplanted for field growth.

In many such farming operations, particularly those of large scale, seedling trays are used for seed germination wherein each tray generally comprises a large number of individual cells. The cells are filled with a growth medium and the seeds are then implanted in the growth medium. After the seeds germinate, they grow until they emerge from the growth medium and are allowed to reach a desired size. The seedlings are then removed from the cells in the trays and are transplanted in a field.

To facilitate the germination and growth of plants, water culture or hydroponic growth of plants has been conducted for many years. Hydroponic systems have included the germination of seedlings on floating means such as floating trays. It is known to use seedling trays made of Styrofoam. Such Styrofoam solid material trays are buoyant and float on water but they do not last long since the Styrofoam tends to break off. Accordingly it is necessary to replace the trays after a limited number of uses. Therefore there is a need for a durable and long lasting multi-cell floating seedling tray for hydroponically growing plants.

SUMMARY OF THE INVENTION

It is an object of the present invention to provide a seedling tray constructed of a rigid, dense solid plastic material that may be used for hydroponic seed growing in which the tray may be used over and over again.

Another object of the invention is to provide a multi-cell floating seedling tray for hydroponically growing plants which is made of a rigid, dense solid plastic and which has air chambers formed therein that allow the tray to be sufficiently buoyant to allow for proper water flow through openings or weep holes at the bottom of the cells.

Still another object of the present invention is to provide a multi-cell floating seedling tray for hydroponically growing plants such as tobacco which is constructed of two pieces of rigid, dense solid plastic material heat welded together to form a durable tray.

The present invention achieves the above and other objects by providing a seedling tray having a body member constructed of a rigid, dense solid plastic with side and end walls and an upper surface. A plurality of planting cells are formed in the upper surface with the cells being integrally connected together in rows and columns and extending downwardly from the upper surface and terminating in a common lower plane. Each of the cells has walls defining a larger first opening at a top thereof and converging downwardly and inwardly to define a smaller second opening at a bottom thereof. A plurality of air chambers are formed between adjacent ones of the cells, with the air chambers being closed at the top and initially open at the bottom. A bottom plate member constructed of a rigid, dense solid plastic material is fixedly attached to the bottom of the body member at the common lower plane. The bottom plate member has a plurality of third openings therein corresponding in number and aligned in rows and columns with the second openings whereby the bottoms of the cells are sealingly engaged with the third openings and the open bottoms of the air chambers are sealingly closed by the plate member. Each of the cells further may have a nipple extending downwardly from the bottom thereof with the nipple having a passageway therethrough communicating with the second opening. The rigid, dense solid plastic material preferably is a polyolefin such as polyethylene or polypropylene and has a density of about 1 g/cm$^3$.

These together with other objects and advantages, which will be subsequently apparent, reside in the details of construction and operation as more fully described and claimed hereafter, reference being made to the accompanying drawings forming apart hereof, wherein like numeral refer to like parts through out.

DETAILED DESCRIPTION OF THE PREFERRED EMBODIMENTS

Figure 1:
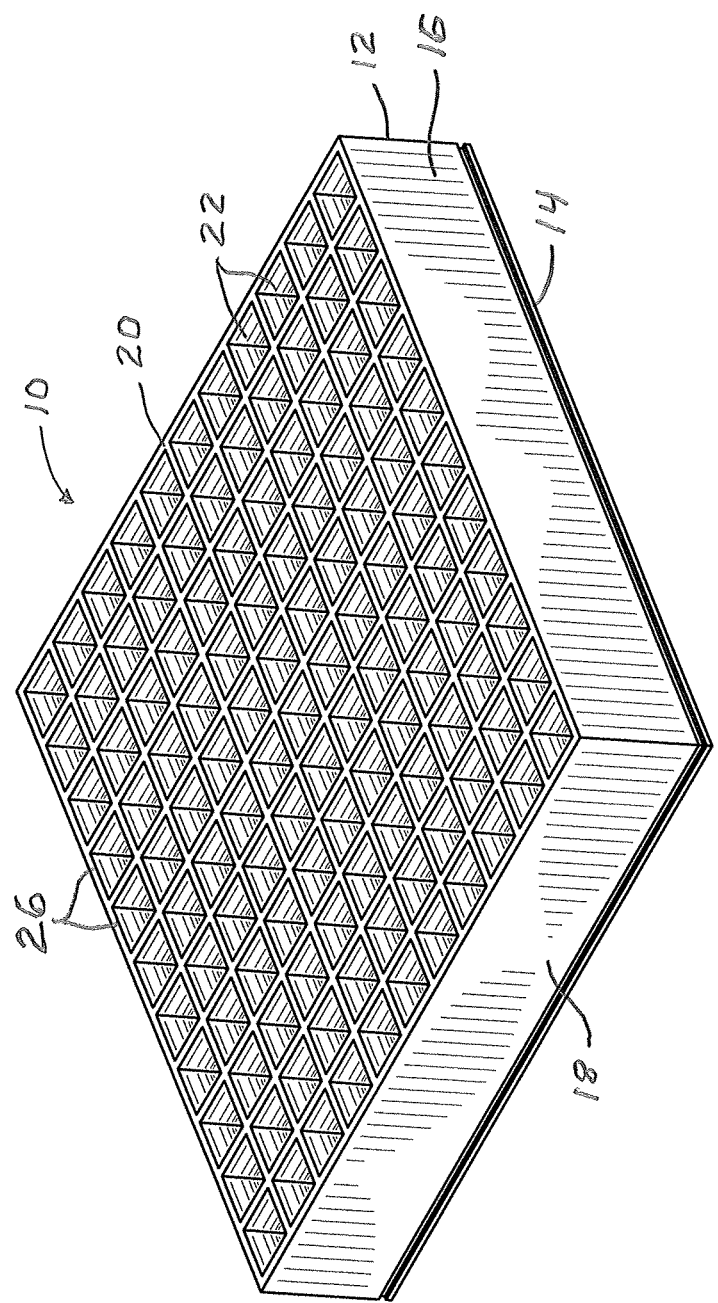
FIG. 1 is a perspective view of the top of a multi-cell seedling tray according to the present invention.

Referring to the drawings, a seedling tray, generally referred by the numeral 10, is shown in FIG. 1 which includes a top body member 12 constructed of a rigid, solid plastic material having a bottom plate member 14 fixedly attached thereto, such as by heat or hot welding using a hot plate. A suitable plastic material is a polyolefin such as polyethylene or polypropylene having a density of about 1 g/cm$^3$, which is the density of water. As shown in FIGS. 1 and 3-5, the top body member 12 is comprised of a pair of opposed side walls 16 and a pair of opposed end walls 18 and having a plurality of tapered germinating cells 22 integrally connected to one another in rows and columns and formed in an upper surface 20 of the body member. The cells extend downwardly from the upper surface and terminate in a common lower plane.

Each of the cells 22 has walls 24 defining a square larger first opening 26 at a top thereof and converging downwardly and inwardly to define a flat bottom having a smaller second opening or weep hole 28 therein.

Figure 6:
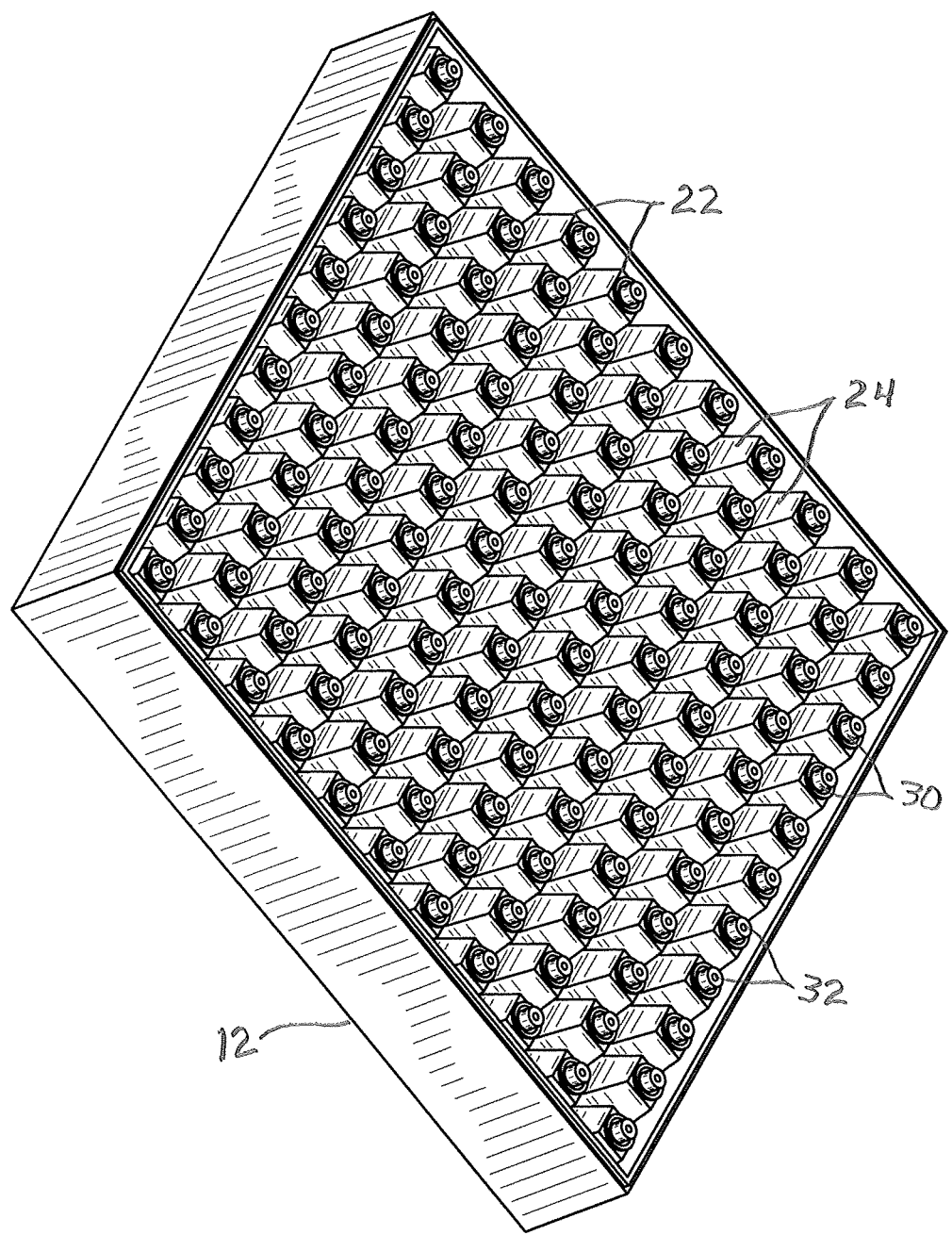
FIG. 6 is a perspective view of the bottom of the body member of the tray of FIG. 1.

As shown in FIG. 6, each of the cells has a cylindrical nipple 30 extending downwardly from the second opening 28. The nipple has a passageway 32 extending therethrough which communicates with the second opening 28.

Figure 2:
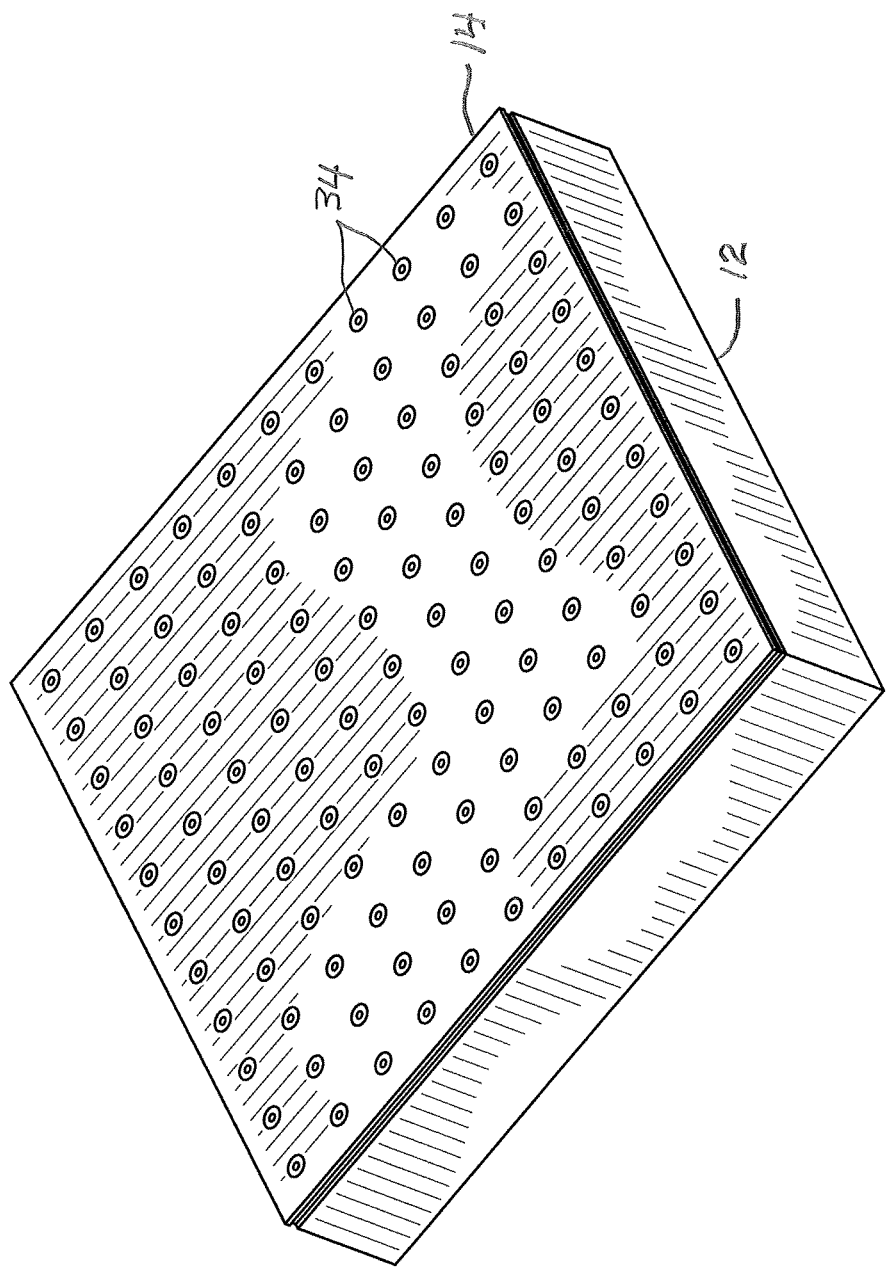
FIG. 2 is a perspective view of the bottom of the multi-cell seedling tray of FIG. 1, illustrating openings in the bottom of the tray.
Figure 3:
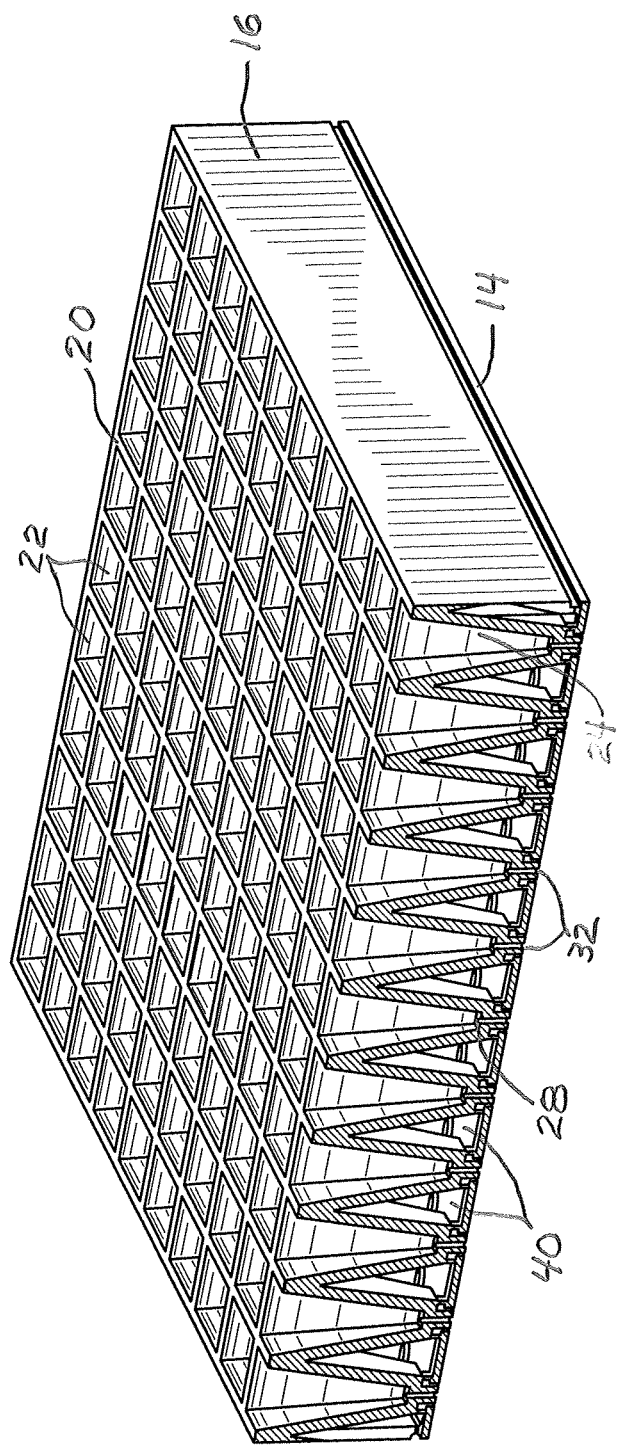
FIG. 3 is an enlarged cross-sectional view taken along the middle of the tray of FIG. 1 illustrating the internal construction of the seedling tray.
Figure 4:
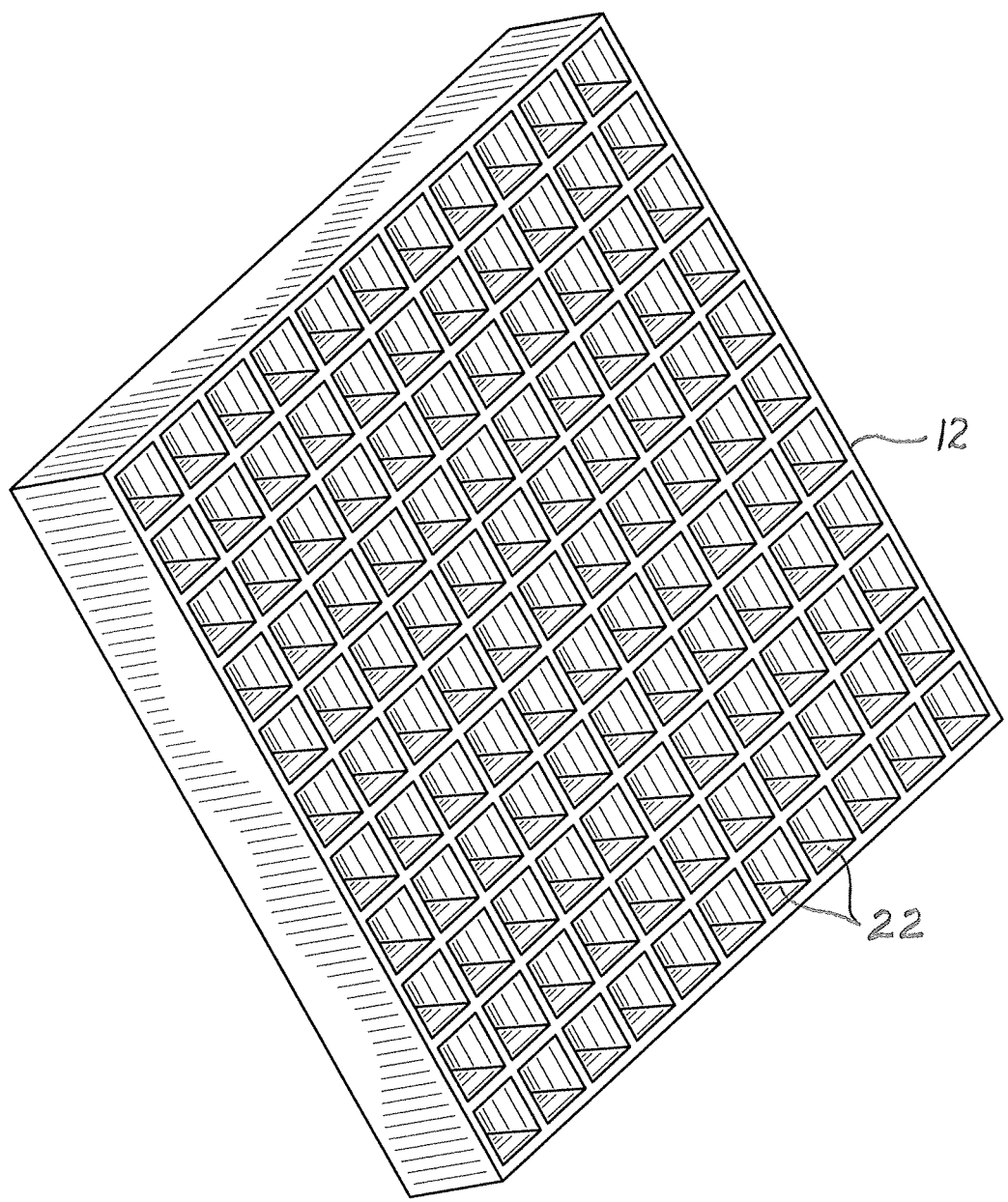
FIG. 4 is a perspective view of the top of the body member of the tray of FIG. 1.
Figure 5:
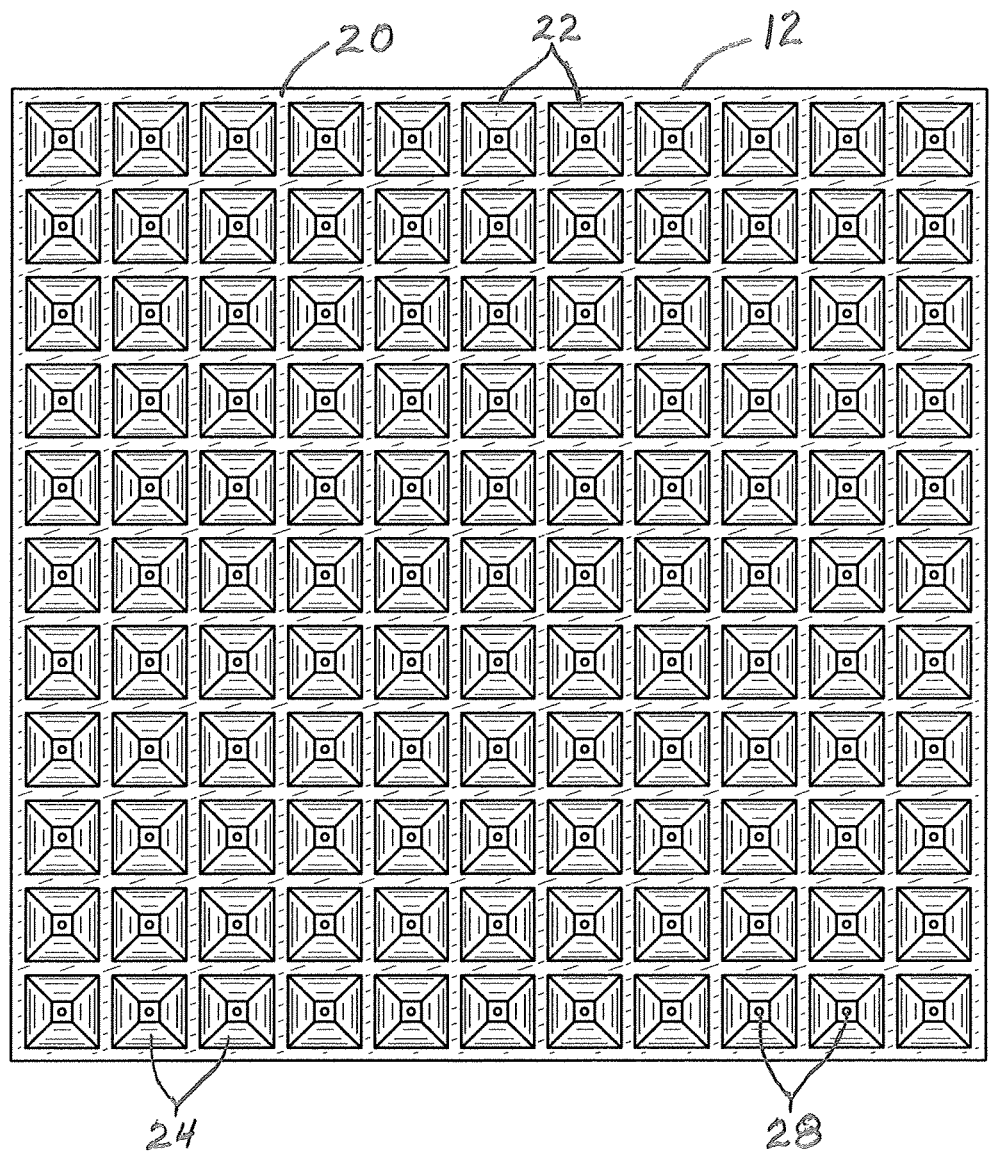
FIG. 5 is a top plan view of the tray of FIG. 1.
Figure 7:
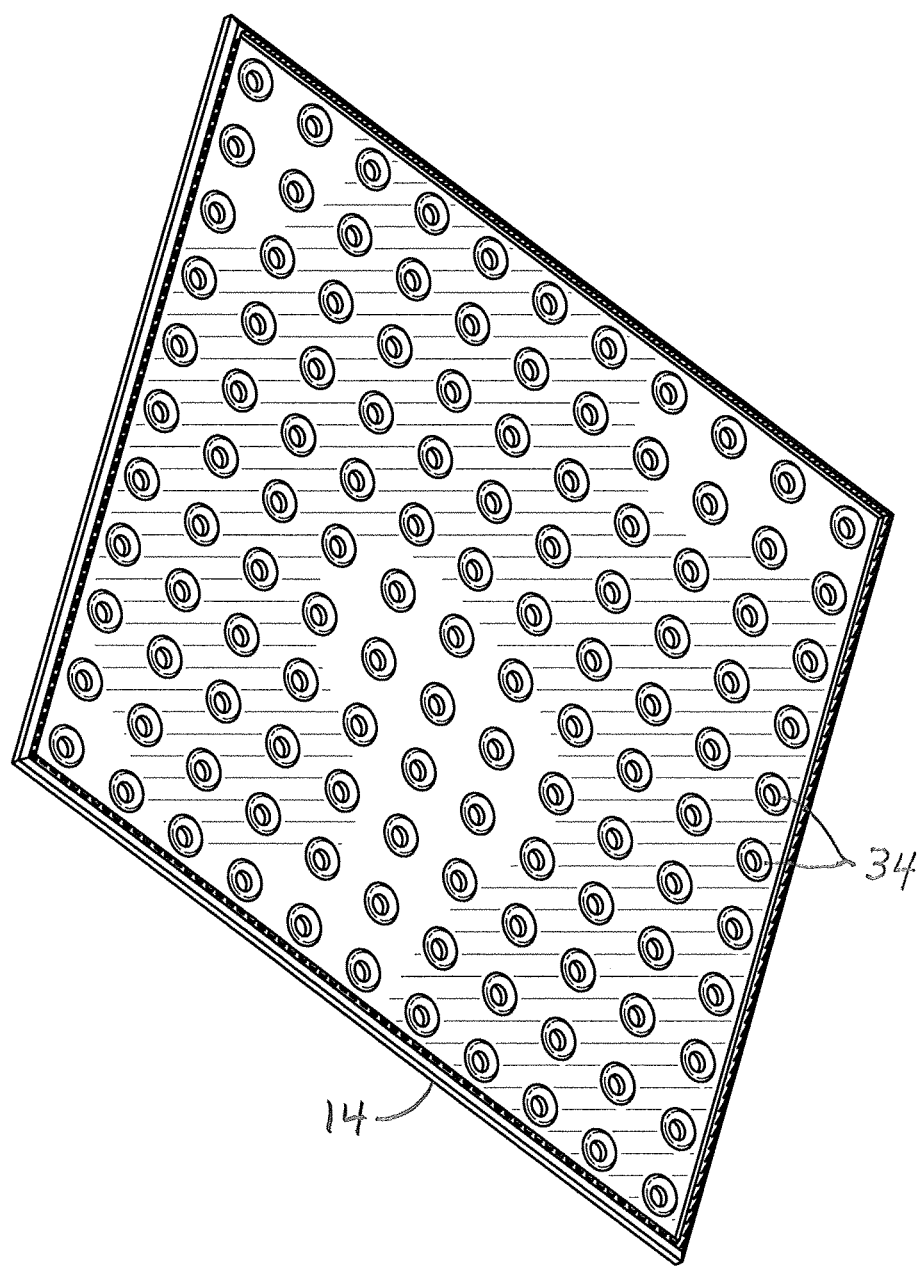
FIG. 7 is a perspective view of the bottom plate of the tray of FIG. 1.

As shown in FIG. 7, the bottom plate 14 has a plurality of third openings 34 therein corresponding in number and aligned in rows and columns with the second openings 28 and the nipples 30. As best shown in FIGS. 1-3, the bottom plate 14 is fixedly attached to the bottom of the body member 12 so that the nipples extend through the third openings 34. The outter ends of the nipples 34 terminate in the same plane as the bottom surface of the bottom plate 14.

The bottom plate and the top body member are secured together through heat or hot plate welding. One method of conducting hot plate welding is to insert a heated metal plate between the bottom of the top body member and the top of the bottom plate member and after the surfaces are fully heated, removing the plate whereby the body member and the bottom plate are hot welded to each other.

As shown in FIG. 3, when the bottom plate 14 has been hot welded onto the bottom of the top body member 12, enclosed air tight air chambers 40 are formed between adjacent ones of the cells 22. The air chambers 40 are triangular in shape and are initially formed in the top body member to have an open bottom end. When the bottom plate is welded to the bottom of the top body member, the bottoms of the air chambers 40 are closed so that no liquid or other matter may enter into the air chambers.

The air chambers are an important aspect of the present invention in that they provide a buoyancy which allows the completed seedling tray to float higher in water when used to grow plants hydroponically. Moreover, when the tray floats higher in the water, this allows for a proper amount of water to flow through the passageway 32 of the nipples 30 and the second openings 20 at the bottom of the cells. If the enclosed air chambers were not in the tray, the tray would sink into the water too deep since it is made of a rigid, dense solid plastic material. If the tray were to sink too deeply into the water, it would be easily tipped and too much water would get into each cell.

Figure 8:
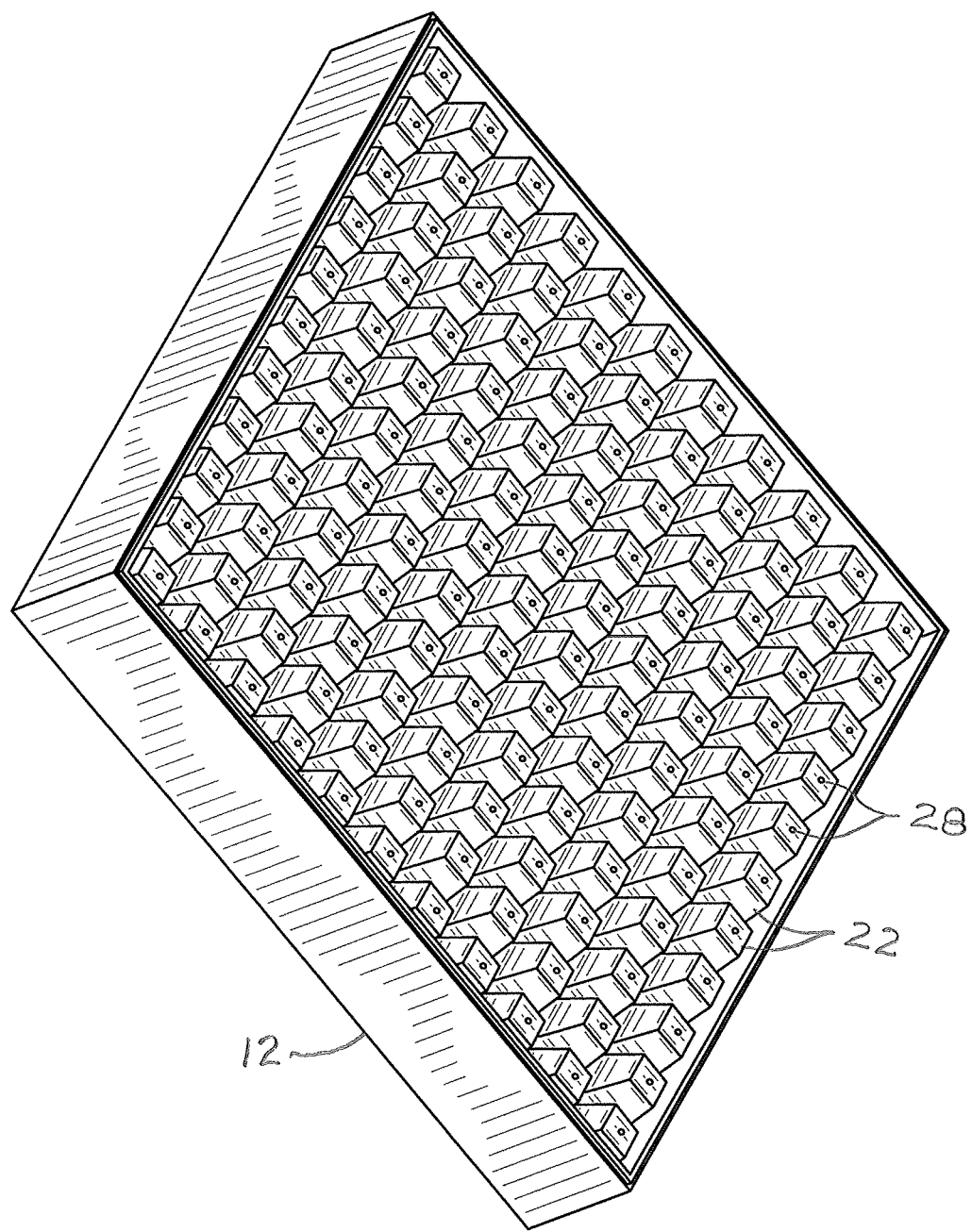
FIG. 8 is a perspective view of the bottom of another embodiment of the body member of the tray of FIG. 1.

Shown in FIG. 8 is another embodiment of a body member 12 of the tray wherein the cells are flat on the bottom and do not have nipples extending downwardly therefrom as in the first embodiment. When a bottom plate member 14 is welded thereto, the openings 28 at the bottom of the cells are aligned with and directly connected to the openings 34 in the bottom plate member.

The welded two part design of the tray constructed of a rigid, dense solid plastic material results in a rugged product that lasts many life cycles and is a significant improvement over a less rugged product such as a tray made of Styrofoam.

Numerous other modifications and adaptations of the present invention will be apparent to those skilled in the art and thus, it is intended by the following claims to cover all such adaptations which fall within the true spirit and scope of the invention.

What is claimed:

1. A seedling tray comprising: a top body member constructed of a rigid, solid plastic material and having side walls, end walls and an upper surface;

a plurality of planting cells formed in said upper surface, said plurality of planting cells being integrally connected together in rows and columns and extending downwardly from said upper surface and terminating in a common lower plane;

each of said planting cells having walls defining a larger first opening at a top thereof and converging downwardly and inwardly to define a bottom surface forming said common lower plane with a second opening in said bottom surface;

a cylindrical nipple extending downwardly from said bottom surface of each of said planting cells and having a passageway forming said second opening, each said cylindrical nipple having a nipple outer end spaced from said bottom surface of each of said planting cells;

a plurality of air chambers formed between adjacent ones of said planting cells with each of said air chambers being closed at the top thereof and open at the bottom thereof; and a bottom plate member constructed of a dense solid plastic material and having a top surface which is heat welded to said bottom surface of said top body member at said common lower plane; and a plurality of third openings said bottom plate member and which correspond in number, and alignment with said rows and columns in said top body member, said plurality of third openings each passing through said bottom plate top surface to a bottom plate bottom surface, each of said nipples extending from said bottom of one of said plurality of planting cells through said third openings, and being sealingly engaged with said bottom plate member adjacent to said third openings in said bottom plate member with said nipple outer end of each said nipple terminating below said bottom plate top surface and at said bottom plate bottom surface, wherein when said open bottoms of said air chambers are sealed closed by said bottom plate member when said top surface of said bottom plate member is heat welded to said common lower plane of said top body member around each of said nipples intermediate an upper end of each said nipple and said outer end of each said nipple, said passageway between said second opening and said third opening will be maintained open.

2. The seedling tray of claim 1 wherein said rigid, solid plastic material has a density of about 1 g/cm$^3$.

3. The seedling tray of claim 2 wherein said rigid, solid plastic material is a polyolefin.

4. The seedling tray of claim 3 wherein said polyolefin is one of polyethylene and polypropylene.

* * * * *